Patented May 10, 1938

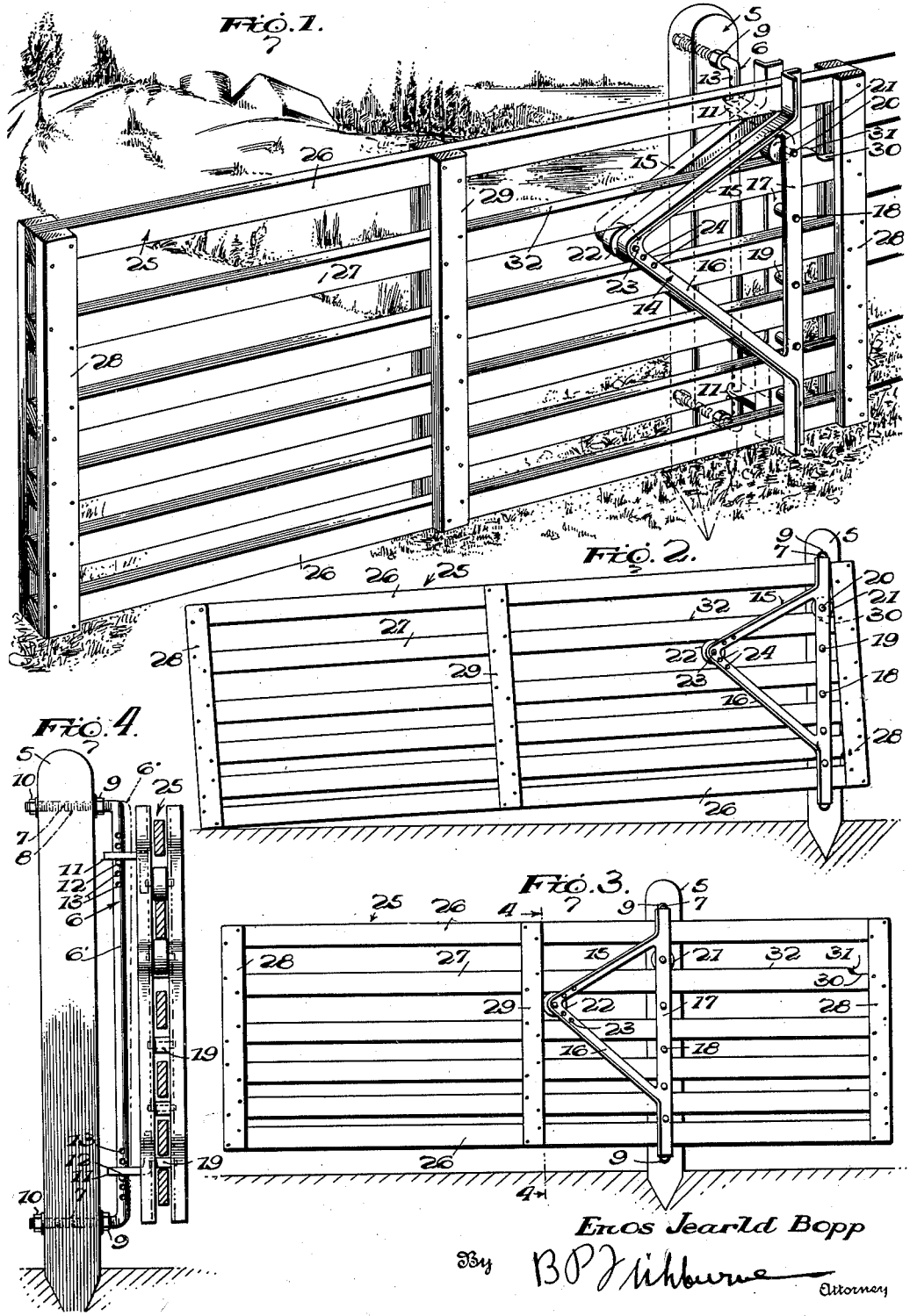

2,116,821

UNITED STATES PATENT OFFICE 2,116,821

GATE

Enos Jearld Bopp, Illinois City, Ill.

Application April 9, 1937, Serial No. 136,010

1 Claim. (Cl. 39—79)

My invention relates to gates.

An important object of the invention is to provide a gate which may be shifted longitudinally, and subsequently swung to the open position.

A further object of the invention is to provide a gate of the above mentioned character having its free end adapted to rest upon the ground when the gate is in the closed position or in other partly open or open positions, to relieve the post carrying the gate, of excessive strains.

A further object of the invention is to provide a gate of the above mentioned character which is adapted to be supported by a crane when swung horizontally and to be also suitably held against longitudinal movement, when in the closed position.

A further object of the invention is to provide adjustable means for the crane so that the gate may have its free end resting upon the ground, when in the closed position, regardless of the inclination of the ground.

A further object of the invention is to provide a crane, which as a unit, is simple, strong, and readily adjustable to meet the conditions under which it operates.

Other objects and advantages of the invention will be apparent during the course of the following description.

In the accompanying drawing forming a part of this application and in which like numerals are employed to designate like parts throughout the same, Figure 1 is a perspective view of a gate embodying my invention, showing its free end raised as the gate has been shifted longitudinally slightly from the closed position, Figure 2 is a side elevation of the gate, showing the same closed with its free end resting upon the ground, Figure 3 is a side elevation of the gate, showing the same shifted longitudinally to the end of its travel, prior to turning, and, Figure 4 is a transverse section taken on line 4—4 of Figure 3.

In the drawing, wherein for the purpose of illustration is shown a preferred embodiment of my invention the numeral 5 designates a vertical post, upon which the gate is mounted. A horizontally hinged swinging device 6 is carried by this post, including a vertical rod 6', having horizontal extensions 7, passing through openings 8 in the post. These extensions are screwthreaded for receiving nuts 9 and 10. These nuts clamp the extensions 7 to the post, and these nuts may be manipulated so that the rod 6' may be adjusted to assume a true vertical position, in the event that the post 5 should not be truly vertical. The hinged device further comprises knuckles 11, which are apertured, for pivotally receiving the vertical rod 6', and these knuckles are supported by pins 12, adapted to be inserted through selected apertures 13, formed in the rod 6'. These knuckles 11 are rigidly secured to a crane, to be described.

This crane comprises spaced triangular frames 14, each of which includes upper and lower arms 15 and 16, which converge from the post 5. Each frame comprises a base 17. This base and the converging arms are preferably formed integral, and the arms 15 and 16 are preferably formed of angle irons. The bases 17 are rigidly connected by pins or rivets 18, passing through spacing elements or sleeves 19. A pin or shaft 20 is connected with and extends between the bases 17 and carries a roller 21, preferably rotatable thereon. A roller 22 is arranged between the frames 14 at the apexes of the converging arms 15 and 16, and this roller is rotatably carried by a pin 23, adapted to be inserted within selected openings 24, whereby the pin 23 may be vertically adjustably secured to the frames 14.

The numeral 25 designates a gate as a whole, comprising longitudinally extending rails 26 and 27. These rails are rigidly connected by transverse end bars or strips 28 and transverse intermediate bars or strips 29. The intermediate bars or strips 29 are arranged near a point equally distantly spaced from the end strips or bars 28, but preferably slightly nearer the strips or bars 28 at the free end of the gate. The rail 27 is provided upon its upper edge and next to the strips or bars 28 adjacent to the crane with a recess or notch 30 having an inclined wall 31, leading to the upper edge 32 of the rail 27.

The rails 26 and 27 of the gate are arranged between the triangular frames of the crane, and the roller 22 engages the lower edge of the rail 27 while the roller 21 engages the upper edge 32 of the rail 27.

The operation of the gate is as follows. When the gate is in the closed position, it has been moved longitudinally in a direction from the post 5 to its fullest extent of longitudinal movement in that direction. The roller 21 now engages within the notch or recess 30, the bottom wall of which is below the upper edge 32 of the rail 27, and the gate will tilt upon the roller 22, engaging the lower edge of the rail 27. This tilting action will permit the free end of the gate resting upon the ground, when in the closed position, thus relieving the post 5 of undue strains, as clearly shown in Figure 2. The free end of the gate may thus rest upon the ground when the gate is closed and also when the gate has been shifted to partly opened or opened positions. This holds the gate against swinging action due to the wind or the like. To open the gate, its free end is first raised from the ground and the free end of the gate is shifted longitudinally toward the post 5, the roller 21 traveling up the inclined wall 31 and then engaging upon the upper wall 32 of the rail 27. The rollers 21 and 22 hold the gate horizontally, and further longitudinal movement of the free end of the gate toward the post 5 may be easily effected. A pedestrian may pass the gate without swinging the same horizontally. If the gate is to be swung horizontally, it is preferably slid toward the post 5 until the roller 22 engages the intermediate strips or bars 29, the roller 22 then being positioned substantially equally distantly spaced from the ends of the gate so that the gate is balanced upon the roller 22. The gate may now be swung horizontally, as the crane is free to turn with respect to the post by virtue of the hinged device. If it is desired to hold the gate in the open position, its free end is moved longitudinally from the post 5 until the roller 21 enters the notch 30, at which time the free end of the gate swings downwardly to rest upon the ground. When the gate is in the closed position it constitutes a lever pivotally supported between its ends by the roller 22. That portion of the gate between the roller 22 and the end next to the post 5 is the shorter arm of the lever while that portion of the gate between the roller 22 and its free end is the longer arm. Since the roller 21 is now over the recess or notch 30, the shorter arm of the lever swings up a relatively short distance to effect a greater downward swinging movement of the free end of the longer arm so that it may engage with the ground. Further, that portion of the gate, when closed, constituting the shorter arm or portion of the lever serves to counter-weight, to some extent, the free end portion of the gate constituting the longer arm, rendering it easier to raise the free end.

It is to be understood that the form of my invention herein shown and described is to be taken as a preferred example of the same and that various changes in the shape, size, and arrangement of parts may be resorted to, without departing from the spirit of my invention or the scope of the subjoined claim.

Having thus described my invention, what I claim is:

A gate structure, comprising a post, a crane comprising a substantially vertical portion and an arm of substantial length carried by the vertical portion and projecting laterally beyond the same, means for pivotally mounting the substantially vertical portion upon the post so that the crane may swing horizontally upon a vertical axis near the substantially vertical portion, a lower roller connected with the arm near its free end, an upper roller connected with the substantially vertical portion near its upper end, the lower roller being arranged at a point horizontally remote from the upper roller, and a gate carried by the crane, said gate having a longitudinally extending part arranged above the lower roller with its lower face engaging the lower roller and beneath the upper roller with the upper face of said part being adapted to engage the upper roller, the upper face being provided adjacent to that end of the gate which is next to said post when it is closed with a recess, the upper roller entering the recess when the gate is closed and the gate then swinging vertically upon the lower roller to lower the free end of the gate so that it may rest upon the ground, the lower roller engaging with the lower face of the longitudinally extending part of the gate when the gate is closed at a point between the ends of said part and at a substantial distance from the opposite ends of said part and at a considerably greater distance from the free end of said part than its opposite end next to the post, the arrangement being such that the relatively short upward vertical swinging movement of that end of the gate next to the post when the gate is closed and caused by the upper roller entering the recess is sufficient to effect a considerably longer downward swinging movement of the free end of the gate to engage the ground and that portion of the gate between the lower roller and the post when the gate is closed serving to counter-balance to a considerable extent the remaining portion of the gate between the lower roller and its free end to render the raising of the free end easier.

ENOS JEARLD BOPP.